United States Patent [19]
Noji et al.

[11] Patent Number: 4,972,636
[45] Date of Patent: Nov. 27, 1990

[54] DAMPING DEVICE IN A STRUCTURE

[75] Inventors: Toshiyuki Noji, Chiba; Hidetoshi Yoshida, Tokyo; Eiji Tatsumi, Chiba; all of Japan

[73] Assignee: Mitsui Kensetsu Kabushiki Kaisha, Tokyo, Japan

[21] Appl. No.: 361,858

[22] Filed: Jun. 5, 1989

Related U.S. Application Data

[62] Division of Ser. No. 216,496, Jul. 8, 1988, abandoned.

[30] Foreign Application Priority Data

Dec. 1, 1987 [JP] Japan .............................. 62-305379
Dec. 24, 1987 [JP] Japan .............................. 62-327650
Mar. 22, 1988 [JP] Japan .............................. 63-67950

[51] Int. Cl.$^5$ .............................................. E02D 27/34
[52] U.S. Cl. ...................................... 52/167 DF; 52/1
[58] Field of Search .................... 52/167 DF, 167, 1

[56] References Cited

U.S. PATENT DOCUMENTS 4,783,937 11/1988 Sato .............................. 52/167 DF

FOREIGN PATENT DOCUMENTS 962502  3/1979 U.S.S.R. ...................... 52/167 DF
999421  1/1962 United Kingdom .......... 52/167 DF
1322807 7/1973 United Kingdom .......... 52/167 DF Primary Examiner—Henry E. Raduazo
Attorney, Agent, or Firm—Wenderoth, Lind & Ponack

[57] ABSTRACT

A damping device has a liquid vessel into which the liquid is injected having the flattening wave motion water surface formed in such a manner that the wave motion direction of the wave motion water surface is a strecher one, damping members are provided in order to damp the sloshing of liquid in the liquid vessel, and wave dissipation devices are disposed at the portion which isn't always soaked in liquid in the liquid vessel. Accordingly, the vibration in a construction occurring by wind, earthquake and the like is absorbed by means of viscosity resistance occurring between liquid and damping member, and the vibration is restricted. Moreover, damping performance can be efficiently exercised by providing various kinds of installation forms.

4 Claims, 8 Drawing Sheets

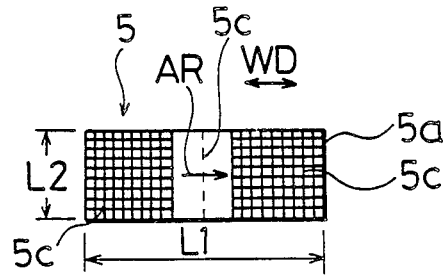
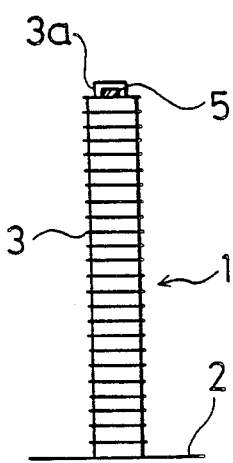
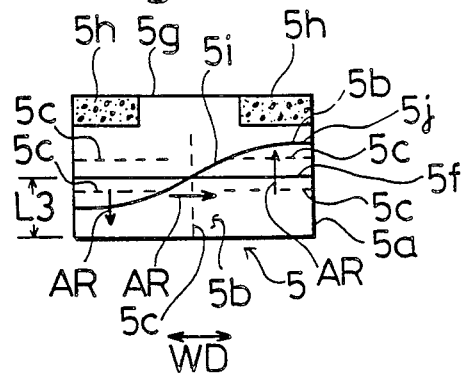
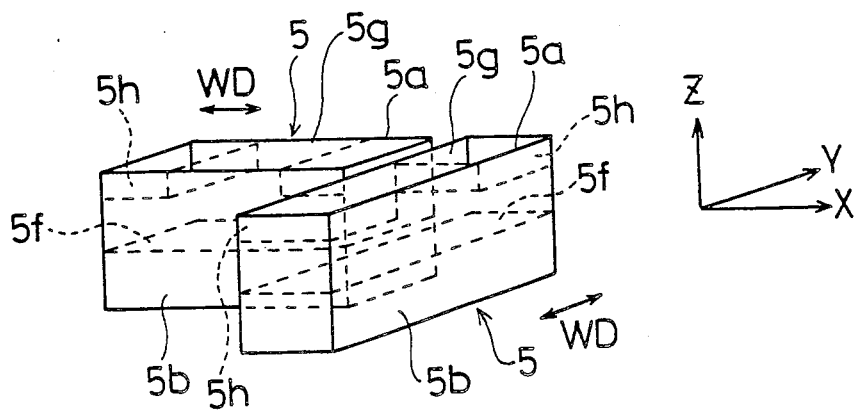

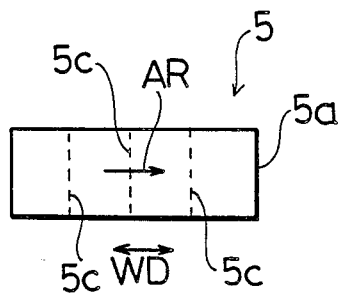
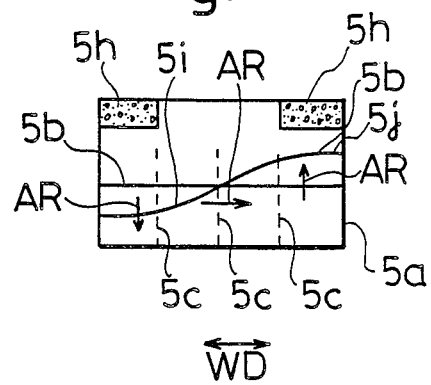
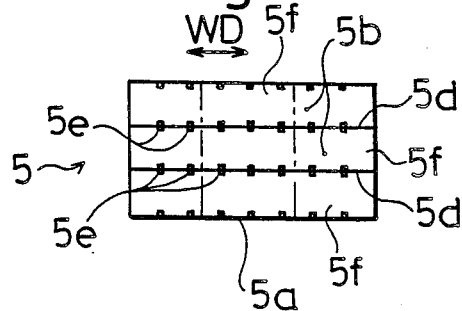
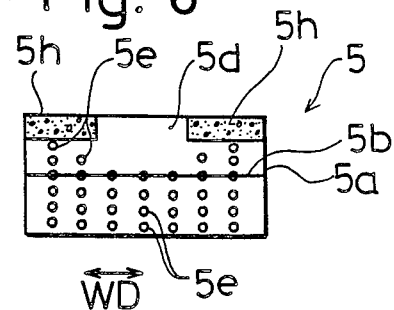
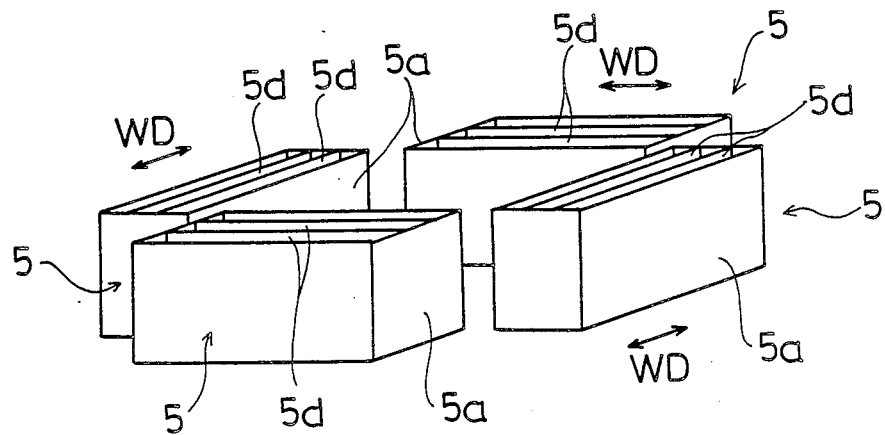

Fig. 12
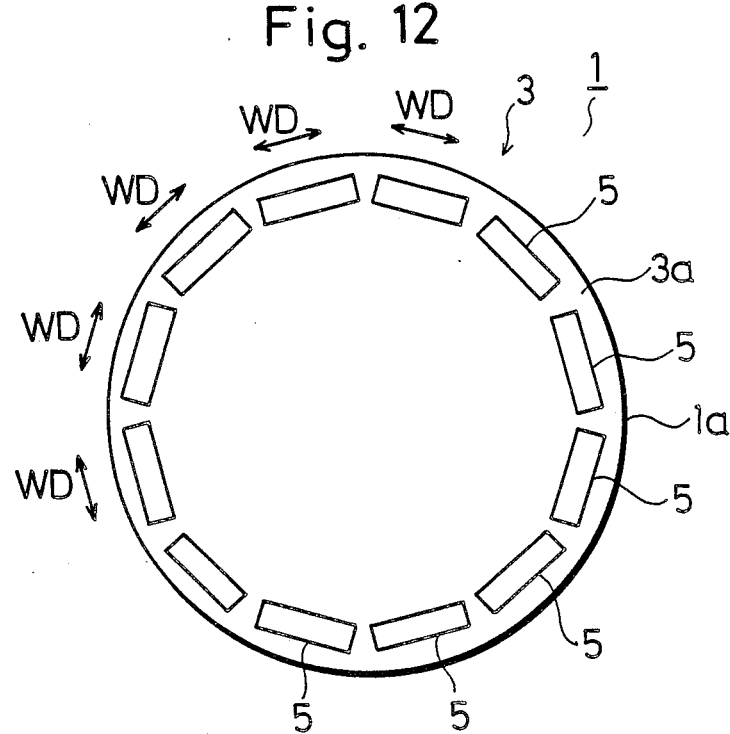
Fig. 13
Fig. 14
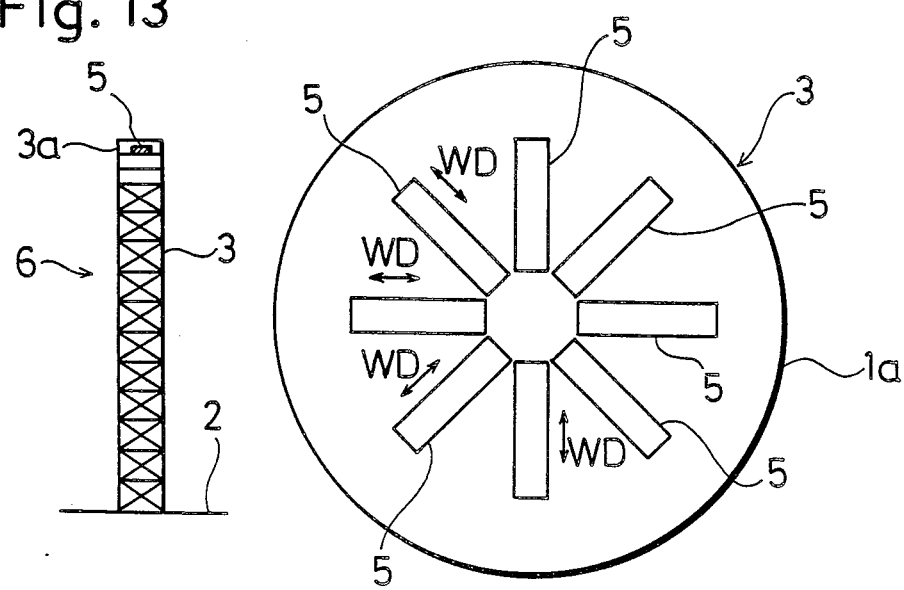

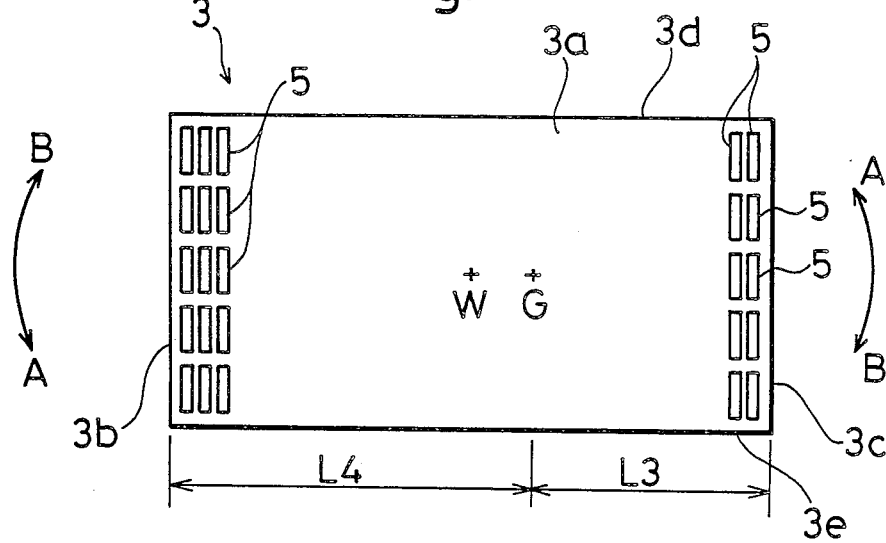
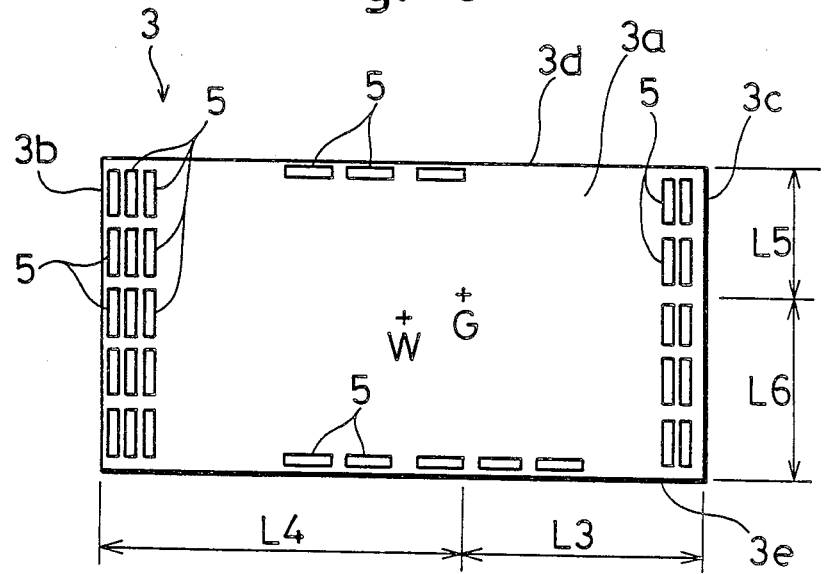

DAMPING DEVICE IN A STRUCTURE

This is a division of Ser. No. 216,496, filed Jul. 8, 1988, now abandoned.

BACKGROUND OF THE INVENTION

The present invention relates to a damping device for preventing the horizontal vibration of a structure from wind and earthquake, the device being disposed on an upper portion of the structure, and a damping structure and damping method using such a device.

In U.S. Pat. No. 4,226,554, the following proposal is advanced. Horizontal vibration of a structure from an earthquake, wind and the like is prevented by damping devices comprising liquid vessels into which a liquid having an open water surface is injected which are disposed on the upper portion of the structure.

However, the above technique does not provide a damping device having an internal constitution with a sufficiently efficient damping, and a technique providing such is desired.

SUMMARY OF THE INVENTION

It is therefore an object of the present invention to provide a damping device having an internal structural constitution and an installation format capable of exercising efficient damping performance, and a damping arrangement and damping method using those devices so as to solve the above-described defects.

That is, the present invention is comprised of a liquid vessel, into which a liquid is injected, having a wave motion water surface formed in such a manner that the wave motion direction of the wave motion water surface is in the elongated direction of the liquid vessel, damping members such as meshes and partition walls and projections for damping the sloshing of the liquid in the liquid vessel, and wave dissipation devices provided at a portion not always in the liquid of the liquid vessel.

According to the present invention, the vibration which proceeds from wind and earthquake in a structure such as a multistory building and tower can be efficiently absorbed by sloshing the liquid in each damping device. And, since there are no mechanical moving parts in the liquid vessel, the device will be reliable over time in comparison with a mechanical damping arrangement. And, it can be easy to perform inspection and maintenance. If a high wave occurs in the liquid of a vessel, sloshing with a large amplitude, the energy is efficiently absorbed by means of wave dissipation devices. Therefore, the cycle of the liquid will not be disturbed and the device is sufficiently reliable.

The damping device is comprised of a liquid vessel, into which the liquid is injected, having the flattening wave motion water surface formed in such a manner that the wave motion direction of the wave motion water surface is in the direction of elongation of the liquid vessel, and damping members such as meshes and partition walls and projections for damping the sloshing of the liquid in the liquid vessel. With the above-described structure, plural damping devices are disposed in such a manner that the elongated direction of the liquid vessel of each damping device faces in different horizontal directions of a structure.

According to this arrangement, the vibration in the horizontal direction from wind and earthquake in a structure such as a multistory building or tower can be efficiently absorbed by relating each such vibrational direction to the sloshing direction of the liquid in each damping device.

Furthermore, the damping device, comprised of a liquid vessel into which a liquid is injected having a wave motion water surface, is formed in such a manner that the wave motion direction of the wave motion water surface is in the elongated direction of the vessel, and has damping members such as meshes and partition walls and projections for damping the sloshing of the liquid in the liquid vessel. With the above-described structure, the damping devices are then disposed on an upper portion of a structure such that the damping devices at a side of the structure distant from the center of rigidity of the structure, such as a side face, are greater in number than those on the reverse side of the structure, closer to the center of rigidity.

According to this arrangement, in case the center of rigidity of a structure is shifted from the center of gravity in the horizontal plane, the vibration energy can be absorbed as equally as possible. Torsional vibration, with the center of rigidity as its center, can also be efficiently absorbed.

Moreover, in an existing structure being provided an elevated water tank on its upper portion, such as a multistory building and tower, the structure of the tank is such that resistance members, such as meshes and partition walls and projections, are provided in the elevated water tank and wave dissipation devices are provided at the upper portion of the elevated water tank. Then, the vibration in an existing structure is restricted by the resistance between the resistance member and the water stored in the elevated water tank.

According to this arrangement, the damping function toward the vibration by wind and earthquake can be added only by providing resistance members in an elevated water tank which is provided on an existing structure such as a multistory building and tower. And, since installation of complicated machinery is unnecessary, the installation is easy. Moreover, a specific installation space is unnecessary, because use of an existing elevated water tank, and its installation on an existing structure, are relatively easy.

Moreover, plural damping devices may be disposed so as to be spaced vertically along a structural body. According to this arrangement, the vibration of a structure having a high-level natural vibration with a complicated vibration mode can be efficiently damped. The arrangement is such that the damping devices are disposed at the maximum amplitude portion of the primary natural vibration, and at least at the secondary natural vibration portion, of a structural body. Damping is then carried out at the maximum amplitude portions toward vibrations having mixed vibration modes. The damping effect is thus efficiently provided.

Furthermore, the arrangement may be such that plural damping devices are vertically spaced along a structural body, with varying sizes of the liquid vessels. Thus each position being provided a liquid vessel has no wasted space. Therefore, the limited space of a structure can be efficiently utilized.

BRIEF DESCRIPTION OF THE DRAWINGS

FIG. 1 is an elevational view showing an example of a structure to which the present invention is applied;

FIG. 2 is a perspective view showing an example of the arrangement of damping devices according to the present invention;

FIG. 3 is a top view showing an embodiment of a damping device of the present invention;

FIG. 4 is a front sectional view of the damping device of FIG. 3;

FIG. 5 is a top view showing another embodiment of the damping device of the present invention;

FIG. 6 is a front sectional view of the damping device of FIG. 5;

FIG. 7 is a top view showing another embodiment of a damping device;

FIG. 8 is a front sectional view of the damping device of FIG. 7;

FIG. 9 is a perspective view showing another arrangement of damping devices according to the present invention;

FIG. 12 is a top view showing a further arrangement of damping devices according to the present invention;

FIG. 13 is a front elevational view showing another structure using damping devices;

FIG. 14 is a top view of another arrangement of damping devices according to the present invention;

FIG. 17 is a top view showing the arrangement and construction of damping devices according to the present invention;

FIG. 18 is a top view showing another arrangement and construction of the damping devices of the present invention;

DESCRIPTION OF THE PREFERRED EMBODIMENT

Figure 19:
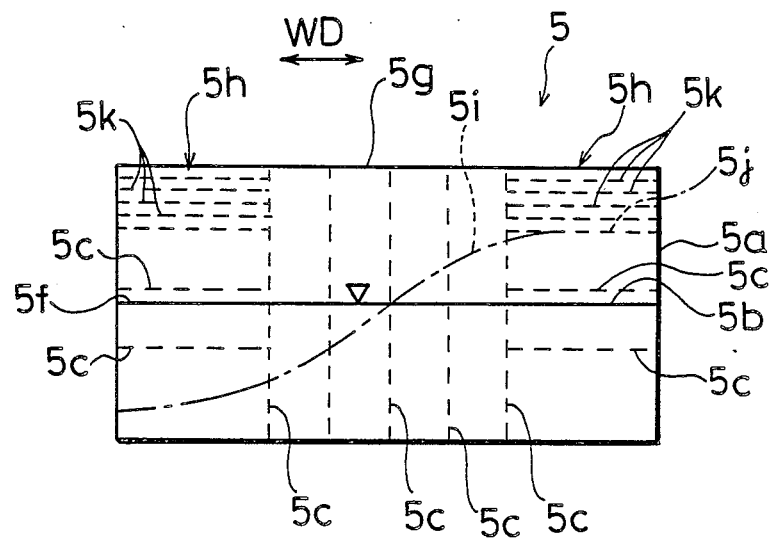
FIG. 19 is a front sectional view showing another example of a damping device according to the present invention.

A multistory building 1 has a structural body 3, which is built on the ground 2 as sown in FIG. 1, and plural damping devices 5 are disposed on an apical portion 3a of the structural body 3. Two damping devices 5 are disposed so as to extend perpendicularly to each other, as shown in FIG. 2. Each damping device 5 has a liquid vessel 5a on which a lid member 5g is provided on an upper portion thereof, and the form of the vessel 5a is rectangular, as shown in FIGS. 3 and 4. The liquid 5b, which is water, or a liquid having the same viscosity as water or a higher viscosity than water, is injected into each liquid vessel 5a. Wave motion water surface 5f, wave motion occurring by sloshing the liquid 5b, is formed in the shape of a rectangle in the liquid vessel 5a by injected liquid 5b, as shown in FIG. 2. Two mesh portions 5c acting as damping members and comprising stainless steel, vinylon, high efficiency fiber and the like are provided at two levels, thus forming upper and lower portions, as shown in FIG. 4. Damping members are thus at both sides, right and left in the liquid vessel 5a in FIG. 3. Mesh 5c is also provided perpendicularly at the center portion of FIG. 4. Wave dissipation devices 5h, 5h are provided at both sides of the lid member 5g at the upper portion of the liquid vessel 5a. Each wave dissipation device 5h is composed of a porous member formed by a block of scrap iron, crushed stone, metal chip and the like, or an aggregation of meshes provided by superimposing a number of meshes 5k in the horizontal direction, as shown in FIG. 19.

With the above-described structure of a multistory building 1, when the structural body 3 vibrates from an earthquake, gusts of wind and the like, the damping device 5 provided at the apical portion 3a also vibrates. Then the liquid 5b in the damping device 5 sloshes in the elongated directions WD of the wave motion water surface 5f, synchronizing with the vibration of the structural body 3, as shown in FIGS. 3 and 4. That is, the liquid 5b easily starts sloshing according to the vibration of a multistory building 1 by harmonizing the sloshing cycle of the liquid 5b with the primary natural vibration cycle of the multistory building 1, and the vibration energy of the multistory building 1 is absorbed by its wave motion. The sloshing cycle of the liquid 5b is determined by the length L1 in the long side direction of the liquid vessel 5a and the height of liquid L3 of liquid 5b in a stationary condition, as shown in FIGS. 3 and 4. When the liquid 5b sloshes, the liquid 5b passes the meshes 5c provided in the liquid vessel 5a in the up and down directions in FIG. 4, as shown by the arrows AR. At this time, a viscosity resistance acting between the liquid 5b and the meshes 5c acts in the direction in which the movement of the liquid 5b is restrained. Accordingly, the sloshing of the liquid 5b is damped, and the ability of the structure to absorb the power of the vibration energy is improved.

When the vibration of the structural body 3 becomes greater than a predetermined value, the height of the wave of the liquid 5b in the damping device 5 also becomes higher. Then, an apical portion 5j of a wave 5i reaches the lid member 5g as shown in FIG. 4. However, when the apical portion 5j of the wave directly collides with the lid member 5g and rebounds, the cycle of the liquid 5b is disturbed, and it becomes impossible to exercise the proper damping effect. But the wave dissipation devices 5h, 5h are disposed at both sides of the device in the direction of the wave motion where the apical portion 5j of the wave 5i is produced in the liquid vessel 5a. The wave 5i will flow into the many cavities of the porous member of a wave dissipation device 5h, the wave 5i colliding with the wave dissipation device 5h, and its energy will be efficiently absorbed. Therefore, the wave does not rebound and confuse the motion cycle in the vessel. Furthermore, the wave dissipation device 5h prevents waves from colliding with the lid member 5g directly. Therefore, excess pressure does not occur on the lid member 5g by the wave, and the disturbance of the motion cycle by the lid member 5g can be prevented. Accordingly, the vibration absorbing operation of the damping device 5 is smoothly performed.

Figure 16:
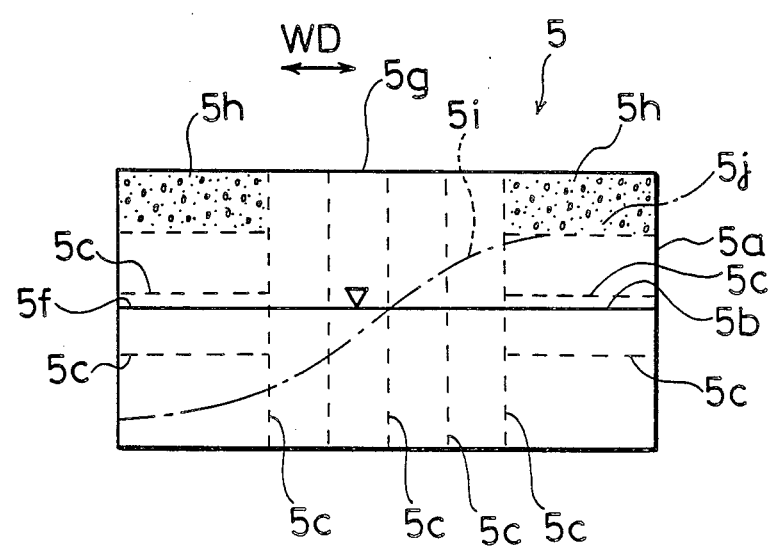
FIG. 16 is a front sectional view of another damping device.

The above embodiment has described the meshes 5c as used as damping members provided in the liquid vessel 5a. But, any configuration, form, and installation mode of a damping member is available, as long as the damping member can damp the sloshing of the liquid 5b in the liquid vessel 5a. For example, it may be that plural meshes 5c are provided in such a manner that the liquid vessel 5a is divided in the vertical direction of FIG. 6, as shown in FIGS. 5 and 6. Furthermore, it is possible that the meshes 5c are contiguous in the vertical direction and the horizontal direction of the liquid vessel 5a, as shown in FIGS. 16 and 19. If the meshes 5c are provided at both sides of the liquid vessel 5a at levels, the height of the wave 5a of the liquid 5b can be restricted by the meshes 5c provided at those levels. Therefore the damping efficiency can be exercised toward earthquakes and the like occurring with larger vibrations.

And, besides members 5c, partition walls 5d may be provided partitioning the liquid vessel 5a in the direction of the wave motion of the liquid 5b in the liquid vessel 5a, that is, in the right and the left direction in the figure as shown in FIGS. 7 and 8. The water surface of the wave motion 5f is thus divided into plural portions. Moreover, many projections 5e are disposed at the partition walls 5d, for example in the shape of dents on the center portion, as shown in FIG. 8. Then the vibration of the liquid 5b is damped by the viscosity resistance occurring between the projections 5e and the liquid 5b. The above-described method is naturally available. Moreover, a chip of steel, plastic moulding goods and the like can be disposed in the liquid vessel 5a as a damping member.

Figure 10:
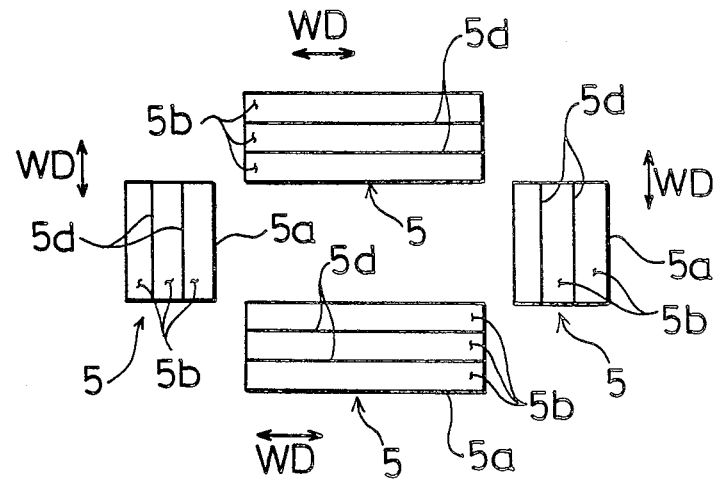
FIG. 10 is a top view of FIG. 9.
Figure 11:
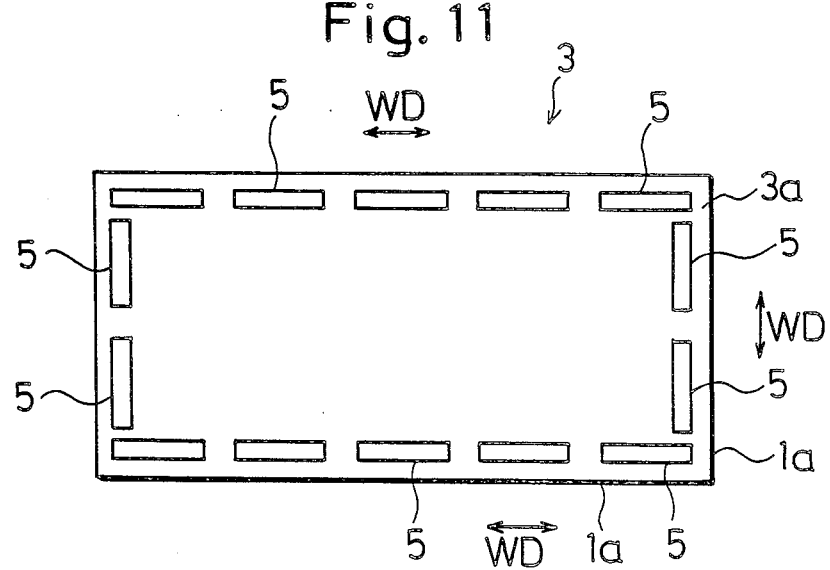
FIG. 11 is a top view showing another arrangement of damping devices according to the present invention.
Figure 15:
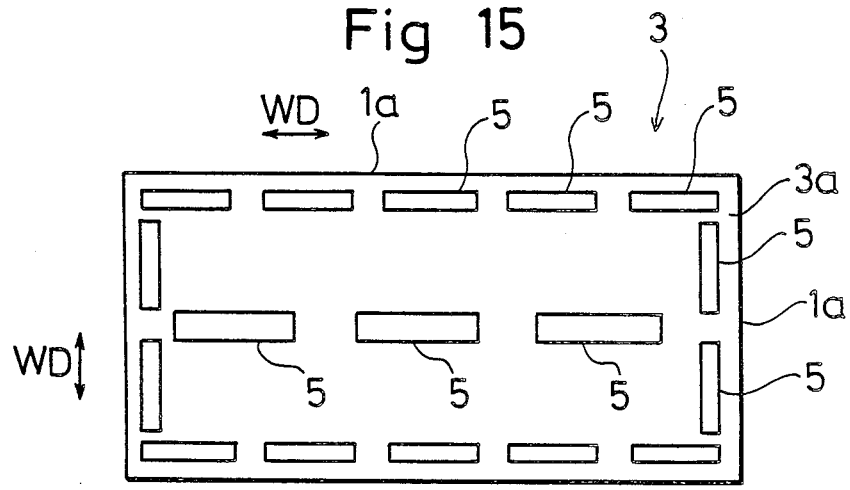
FIG. 15 is a top view of another arrangement of damping devices.

The arrangement forms of the damping devices 5 can be properly selected according to the arrangement place and the necessary damping effect. Since the wave motion of the liquid 5b occurs in the elongated direction of each damping device 5, the damping devices 5 are disposed in such a manner that the elongated directions WD of the water surface of the wave motion 5f of each damping device 5 face in at least two directions of the structure 1 to absorb the vibrations. Then, the vibration acts on the damping devices 5 in two directions at least, and a high damping effect can be achieved. For example, as shown in FIGS. 9 and 10, plural damping devices 5 can be arranged so that the elongated directions WD in which the water surface of the wave motion 5f forms the wave motion face two horizontal directions orthogonal to each other. Accordingly, the vibration in the two orthogonal directions occurring at the structure 1 can be effectively absorbed. Moreover, in the arrangement and form of the damping devices 5, many damping devices 5 can be arranged along the external wall 1a of the structure 1 as shown in FIGS. 11 and 15. (In the case of FIG. 15, the damping devices are also disposed at the center of the structure 1.) In such a case, if there is existing equipment, such as a machine room of an elevator, at the apical portion 3a of the structure 1, the damping devices 5 can be disposed to avoid such existing equipment, and the construction space can be effectively utilized. If the building has a circular structure 1, many damping devices may be disposed along the external wall 1a of the circle, as shown in FIG. 12. And of course the damping devices 5 can be disposed radially, as shown in FIG. 14. Furthermore, the damping effect can be substantially improved by arranging the damping devices along the external wall 1a of a structure 1, at which point the vibration amplitude becomes bigger.

In case the position of the center of gravity W of the structural body 3 shifts from the position of the center rigidity G (in FIG. 17, the position of the center of gravity W locates the center in the up and down directions and in the right and left directions in the structural body 3 in the figure, and the position of the center of rigidity G locates the center in the up and down directions and is to the right to some extent in the figure in comparison with the center gravity W), the structural body 3 generates torsional vibration, with the center of rigidity G as its center, in the directions as shown by the arrows A and B. Then, the farther a distance from the center of the rigidity G is, the bigger the amplitude of a torsional vibration of the structural body 3 becomes. In FIG. 17, the amplitude of the side face 3b on the left in the figure becomes bigger than that of the side face 3c on the right. Then, since the vibration energy of the side face 3b becomes bigger than that of the side face 3c, it is necessary that the vibration absorbing ability of the side face 3b side is bigger than that of the side face 3c side in order to absorb the vibration properly. When the number of damping devices 5 disposed at the side face 3b, having a distance L4 from the center of rigidity G, is more than that disposed at the side face 3c, having a distance L3 from the center of rigidity G, the absorbing quantity of the vibration energy of the side face 3b side increases. In result, the vibration in the directions shown by the arrows A and B of the structural body 3 is smoothly and thoroughly absorbed relative to both sides, the right and left of the center of rigidity G.

In case the position of the center of rigidity G is shifted in the up and down directions of the structural body 3 as well as in the right and left directions as shown in FIG. 18 (In FIG. 18, the position of the center of gravity W locates the center in the up and down directions and in the right and left directions of the structural body 3 in the figure. The position of the center of rigidity G is in the upper portion in the figure to some extent and to the right of the center of gravity W.), the amplitude of the side face 3b, having the distance L4 from the center of rigidity G, and the amplitude of the side face 3e, having the distance L6 from the center of rigidity G, become big. Accordingly, the number of the damping devices 5 to be disposed on the side faces 3b and 3e is greater than that on the side faces 3c and 3d at distances L3 and L5 from the center of rigidity G, respectively. Therefore, the vibration absorbing ability of the side faces 3b and 3e is increased, and the vibration of the structural body 3 is smoothly absorbed without unbalance.

A structure having comparatively long vibration cycles in the flexible structure is suitable for structures to which the damping devices 5 according to the present invention are applied. Of course a tower 6, comprising a steel frame and the like as shown in FIG. 13, can be damped, as well as the multistory building 1 shown in FIG. 1.

The damping effect is exercised in such a manner that, concerning the quantity of the liquid 5b in the liquid vessel 5a, the weight of free water is 0.5–2% of the weight of a structure (the greater the weight of free water, the higher the damping effect), and the damping constant by means of the damping member is about 2–10%.

The above embodiment described the wave dissipation devices 5h as disposed at both sides of the vessel in the wave motion directions WD of the liquid vessel 5a. However, the wave dissipation devices 5h do not always have to be disposed at both sides of the liquid vessel 5a. Any place is available as an installation location of the wave dissipation devices, as long as they are not always soaked in the liquid 5b. Of course the devices can be disposed at all faces of the upper portion or all faces of the sidewall of the liquid vessel 5a.

Furthermore, the form of the structure 1 is not always a square form as shown in FIGS. 17 and 18. Any form, for instance a polygonal or curved form, can be used.

The damping devices according to the present invention can be used both with a new structure and an existing structure. For instance, the damping devices can be retrofitted at the upper portion of an existing structure.

Figures 20, 21, 22:
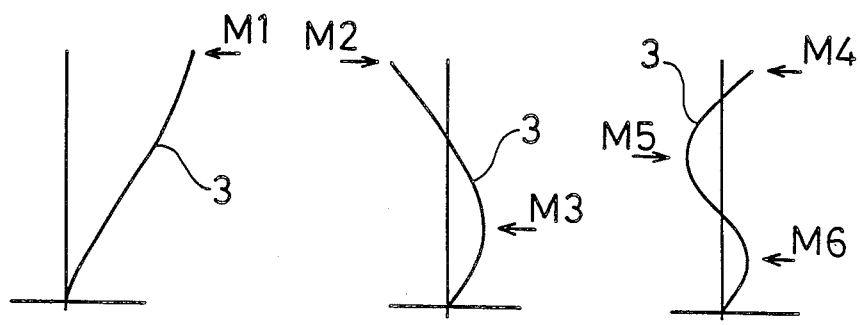
FIGS. 20 through 22 are illustrations of vibration modes of a structure.

With respect to modes of vibration occurring on the structural body 3, there are higher-level modes such as secondary and tertiary modes as well as a primary vibration mode. These vibration forms are as follows: in the primary mode, a maximum amplitude portion M1 exists at the upper edge of the structural body 3, as shown in FIG. 20 (In FIGS. 20 through 22, the structural body 3 is indicated by a line in order to easily understand the explanation). However, the secondary vibration mode is substantially different from the primary mode, as shown in FIG. 21, and maximum amplitude portions M2 and M3 occur not only at the upper edge of the structural body 3 but also at a lower portion, to some extent, in comparison with a center portion. Moreover, in the tertiary vibration mode, as shown in FIG. 22, maximum amplitude portions M4, M5 and M6 occur at the upper edge of the structural body 3, an upper portion in comparison with the center, and a lower portion in comparison with the center, respectively.

Accordingly, to install the damping devices 5 only on the upper portion of the structural body 3 is useful to counteract the primary vibration mode, but may lack effectiveness for the secondary vibration mode or higher level vibration modes.

Figures 23, 24:
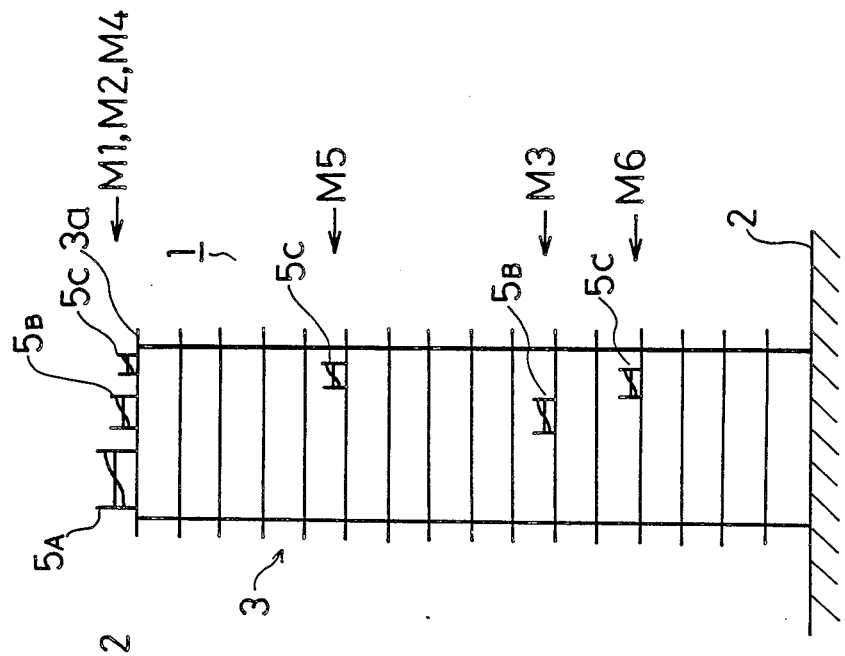
FIG. 23 is a front elevational view showing an embodiment of a damping structure.
FIG. 24 is a front elevational view showing another embodiment of a damping structure.

Therefore, as shown in FIG. 23, the damping devices $5_A$ in which the liquid 5b is stored are disposed at the upper portion of the structural body 3, that is, at the maximum amplitude portion M1 in the primary natural vibration of the structural body 3. In this case, the liquid 5b has a sloshing cycle corresponding to the primary natural frequency of the structural body 3 (ordinarily the cycle corresponds with the primary natural frequency). Moreover, damping devices $5_B$ in which the liquid 5b is stored are disposed at the maximum amplitude portions M2 and M3 in the secondary natural vibration of the structural body 3. In this case, the liquid 5b has the sloshing cycle corresponding to the secondary natural frequency of the structural body 3 (ordinarily it corresponds with the secondary natural frequency). The shorter the sloshing cycle of the storing liquid 5b, that is, the higher the frequency, the smaller the liquid vessel 5a comprising the damping devices 5.

By taking the above-described measures, in the structural body 3 as shown in FIG. 23, the primary vibration is efficiently absorbed by means of the damping devices $5_A$ and the secondary vibration is efficiently absorbed by means of the damping devices $5_B$ in case of earthquake and the like. Furthermore, in order to improve damping efficiency, damping devices $5_C$ in which the liquid 5b is stored are disposed at the maximum amplitude portions M4, M5 and M6 in the tertiary natural vibration as shown in FIG. 24. Damping actions toward the primary and the secondary vibration are by means of the damping devices $5_A$ and $5_B$ as shown in FIG. 23. In this case, the liquid 5b of the damping devices 5c has a sloshing cycle corresponding to the tertiary natural frequency of the structural body 3 (ordinarily, it corresponds with the tertiary natural frequency). Thus, the damping efficiency of the structural body 3 is expanded to the tertiary natural vibration portion.

Heretofore, the present invention has been explained on the basis of the above-described embodiments. But, the embodiments which are mentioned in the present specification are merely exemplary. The scope of the invention is designated by the accompanying claims, and is not to be restricted by the descriptions of the preferred embodiments.

We claim:

1. A damping arrangement on a structure for absorbing vibrations of said structure, comprising:

a plurality of damping devices disposed on an upper portion of said structure, each said damping device comprising an elongated liquid vessel and a liquid disposed inside said elongated liquid vessel such that movement of said elongated liquid vessel will create a wave motion on the surface of said liquid in the direction of elongation of said elongated liquid vessel; and damping members for damping movement of said liquid in each said elongated liquid vessel;

wherein said plurality of damping devices are disposed on said upper portion of said structure such that said direction of elongation of respective said elongated liquid vessels extend in at least two substantially different horizontal directions with respect to said structure.

2. The damping arrangement as set forth in claim 1, wherein:

at least one said damping member is disposed in each half of each said elongated vessel with respect to said direction of elongation of said liquid vessel.

3. The damping arrangement as set forth in claim 1, wherein:

said damping members comprise porous plate members.

4. The damping arrangement as set forth in claim 1, wherein:

said structure has an outer circumference; and said plurality of damping devices are further disposed on said upper portion of said structure such that said plurality of damping devices are substantially at said outer circumference of said structure.

* * * * *